(No Model.) 2 Sheets—Sheet 1.
G. B. ESTERLEY.
CAR TRUCK.
No. 540,091. Patented May 28, 1895.
Fig. 1
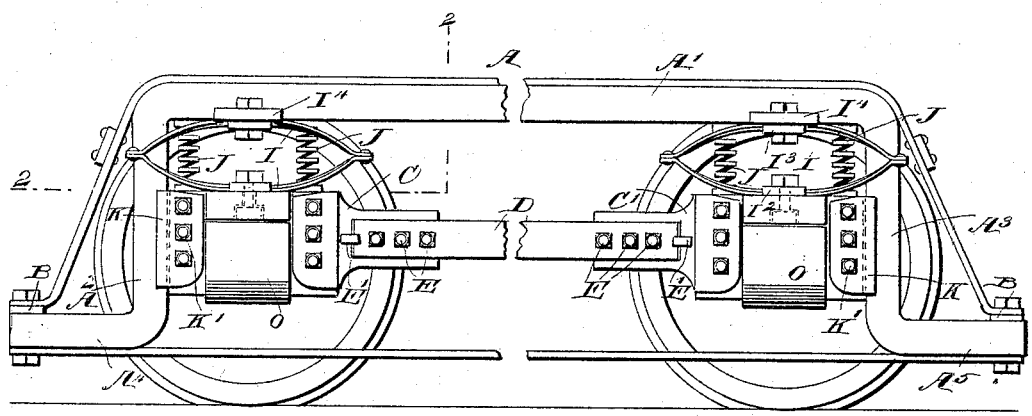
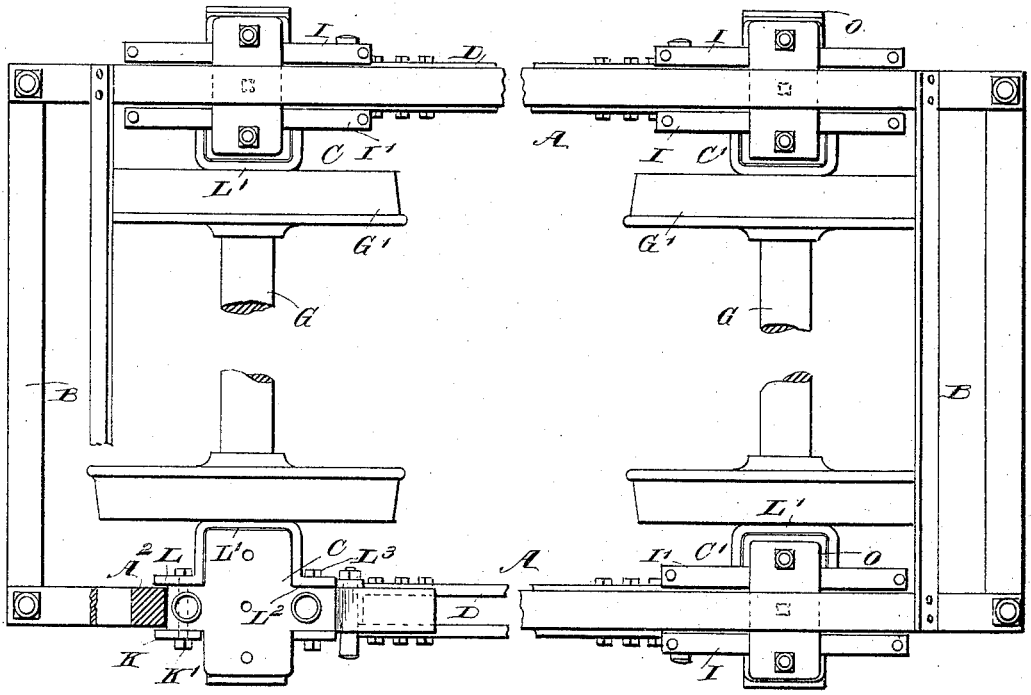
Fig. 2
WITNESSES:
I. S. Walker
Rev. J. Hosta
INVENTOR
G. B. Esterley
BY
Munn & Co.
ATTORNEYS.

(No Model.) 2 Sheets—Sheet 2.
G. B. ESTERLEY.
CAR TRUCK.
No. 540,091. Patented May 28, 1895.
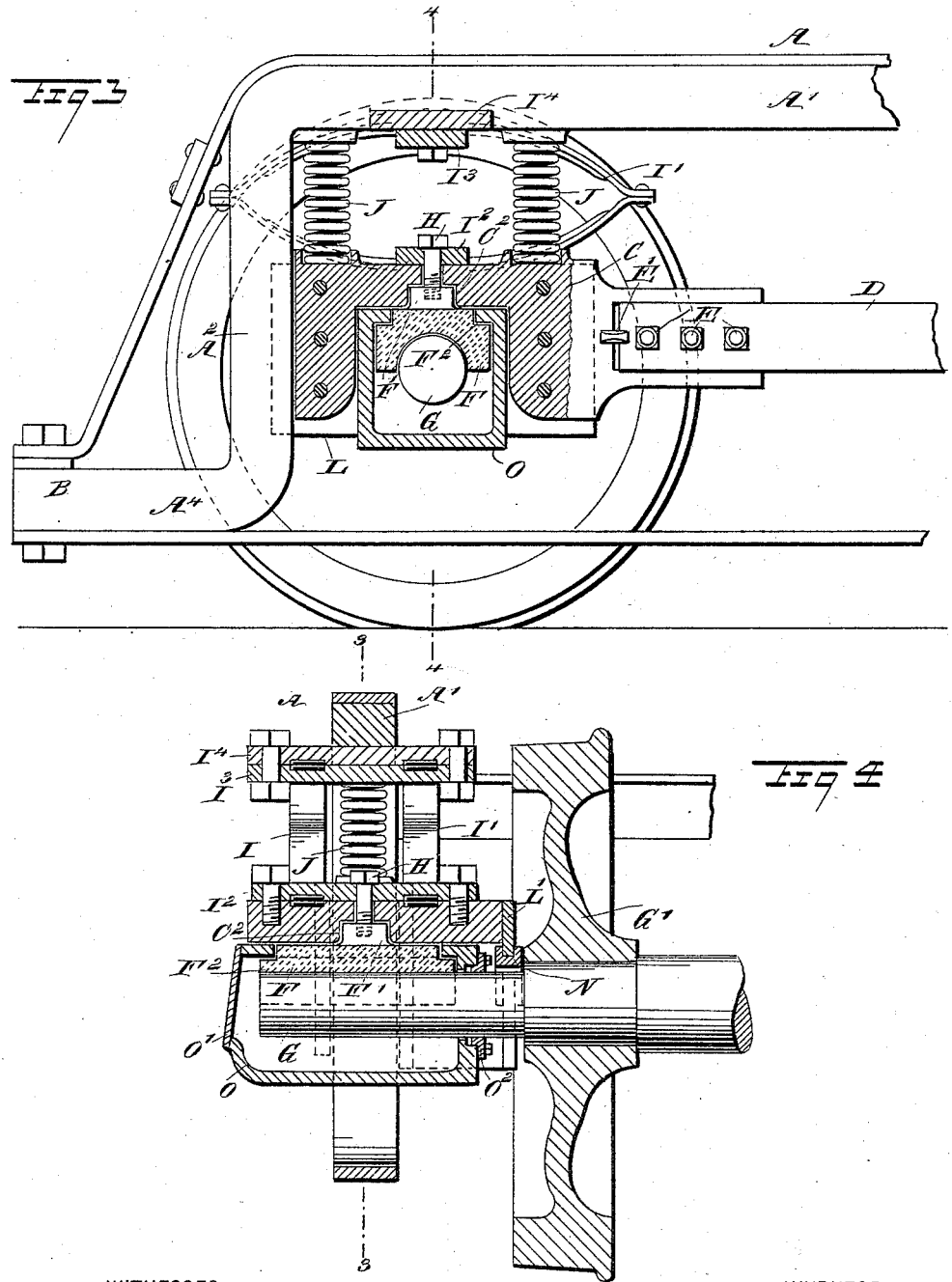
WITNESSES:
H. Walker
Theo. G. Hoster
INVENTOR
G. B. Esterley
BY
Munn & Co
ATTORNEYS.

UNITED STATES PATENT OFFICE.

GEORGE B. ESTERLEY, OF FALL RIVER, MASSACHUSETTS.

CAR-TRUCK.

SPECIFICATION forming part of Letters Patent No. 540,091, dated May 28, 1895.

Application filed October 6, 1894. Serial No. 525,107. (No model.)

*To all whom it may concern:*

Be it known that I, GEORGE B. ESTERLEY, of Fall River, in the county of Bristol and State of Massachusetts, have invented a new and Improved Car-Truck, of which the following is a full, clear, and exact description.

The object of the invention is to provide a new and improved car truck more especially designed for use on street railroad cars, and arranged to reduce the friction of the bearing parts to a minimum, and to take up the side and end thrust to relieve the truck frame of the heavy strain.

The invention consists in certain parts and details, and combinations of the same, as will be hereinafter fully described and then pointed out in the claims.

Reference is to be had to the accompanying drawings, forming part of this specification, in which similar letters of reference indicate corresponding parts in all the views.

Figure 1 is a side elevation of the improvement. Fig. 2 is a plan view of the same with parts in section on the line 2 2 of Fig. 1. Fig. 3 is an enlarged sectional side elevation of part of the improvement, the section being taken on the line 3 3 of Fig. 4; and Fig. 4 is a transverse section of the same on the line 4 4 of Fig. 3.

The improved car truck is provided with a truck frame having each of its sides A made principally of a single bar of square steel, bent approximately in an inverted U-shaped form, as plainly illustrated in Fig. 1, the middle portion A' being on top, with the sides $A^2$ and $A^3$ depending vertically, terminating in horizontally and longitudinally extending ends $A^4$ and $A^5$ respectively. Suitable connecting or cross bars B, are provided to fasten the sides A together, as illustrated in the drawings, and produce a rigid frame.

In each of the sides A, are arranged two car axle boxes C and C', rigidly connected with each other by bars D fastened by bolts E to the said boxes, as plainly illustrated in the drawings, a key E' being provided at the ends of the bars to properly adjust the latter relative to the boxes C and C'. The holes through which the bolts E pass in the boxes C and C', are slightly elongated to permit of driving the keys E' to properly adjust the parts. The box C has its outer end fitted to slide on the inner face of the vertical side $A^2$ of the side A, and the other box C' is similarly fitted to slide on the inner face of the side $A^3$. As both boxes C and C' are alike in construction it suffices to describe but one in detail.

Each box C or C' is made in inverted U-shape longitudinally, as plainly shown in Fig. 3, to receive in the opening thus formed the axle brass F, engaging the car axle journal G, as plainly shown in Figs. 3 and 4.

On the top of the axle brass F, and at or near the middle thereof, is formed a lug F', fitting into a correspondingly shaped recess $C^2$ in the under side of the top of the box C, and this lug F' is engaged by a vertically disposed bolt H, held in the top of the box C, so as to prevent accidental displacement of the axle brass in the box.

Between each box C and the middle portion A' of the side A, are interposed the inner and outer elliptical springs I and I', and the coiled springs J, preferably two in number, and placed between the inner and outer elliptical springs, as plainly shown in Fig. 4. The lower leaves of the elliptical springs I and I' are fastened by a clamping plate $I^2$ to the top of the box C, the said clamping plate $I^2$ extending transversely and being fastened in position by suitable bolts screwing into the top of the box C. The upper leaves of the said springs I and I' are clamped between the plates $I^3$ and $I^4$, extending transversely and bolted together, the clamping plate $I^4$ in addition being fastened to the middle portion A' of the side A. Now it will be seen that by the arrangement described, the springs I, I' and J sustain the load, and at the same time the strain is thrown on the boxes C and C', instead of on the truck frame, thus preventing injury to the latter, and insuring easy riding of the car.

In order to take up any side thrust, each of the boxes C and C' is provided with a thrust plate K, fastened by bolts K' to the outer end of the respective box C or C', the said plate extending into the face of the side $A^2$ or $A^3$ respectively of the side A. An end thrust plate L is secured to the inner face of each box C or C', to engage the inner face of the corresponding side $A^2$ or $A^3$, the said thrust plate L being formed with a U-shaped extension L', (see Fig. 2) which passes around the inner end of the box, to support in its middle portion a yoke N abutting against the hub of the corresponding car wheel G', as will be readily understood by reference to Fig. 4. This U-shaped extension L' is formed with a flange L², fastened by bolts L³ to the inner end of the corresponding box C or C', to securely hold the said thrust plate L and its extension L' in position on the corresponding box C or C'.

The oil casing O is formed at its rear end with an opening for the passage of the journal G, and is provided at its front end with a suitable door O' for the introduction of the necessary lubricant.

The top of the casing O is formed with an aperture through which extends the top of the brass F, the latter being formed with a shoulder F² extending all around to form a seat for the said top of the oil casing O, as plainly illustrated in Figs. 3 and 4, the said shoulder supporting the oil casing O, and at the same time holding the latter securely in position.

The outer faces of the sides of the casing O fit snugly on the inner faces of the sides of the boxes C or C', and on the rear end of the said casing is fastened a dust plate O², through which passes the journal G, and which serves to render the casing dust proof.

It will be seen that by the arrangement described, the friction of the wearing parts is reduced to a minimum, and the strain incident to the motion of the car is transferred from the truck frame to the car axle boxes C and C', and all the end thrust is taken up by the thrust plates K and L. It will further be seen that when it is desired to remove the axle brass for examination, for renewal or for other purposes, then the operator only needs to lift the side bar A² a short distance so that the axle brass F disengages its lug F' from the recess C², it being understood that the bolt H was previously removed. As soon as the lug F' clears the recess C², then the brass with the casing O can be slid transversely out of the car axle box C or C', and the brass can then be examined, or a new one placed in position or repaired, and then the brass with its oil casing O is again moved transversely until the journal G is in its proper place, so that on lowering the side bar A² of the truck, the lug F' again engages the recess C², after which the bolt H is screwed in position to unite the brass with the box.

Having thus described my invention, I claim as new and desire to secure by Letters Patent—

1. A car truck, comprising a frame provided with slideways, axle boxes having guided movement on said slideways, and a bar rigidly connecting the axle boxes and having an adjustable connection therewith to permit of longitudinally adjusting the bar, substantially as described.

2. A car truck, provided with a frame having each side formed of an inverted approximately U-shaped bar, axle boxes connected with each other and each fitted to slide on one of the opposed faces of the depending sides of the said bar, and springs interposed between the said boxes and the middle portion of the said bars, substantially as shown and described.

3. A car truck, comprising a truck frame, axle boxes fitted to slide in the truck frame, a set of inner and outer elliptical springs connecting each axle box with the truck frame, and a set of coiled springs interposed between each axle box and the truck frame and arranged between the set of inner and outer elliptical springs, substantially as shown and described.

4. In a car truck, the combination with an axle box, of a brass fitted in the said box and formed on its top with a lug fitting into a recess in the top of the said axle box, and a bolt held in the said box and screwing in the said lug, substantially as shown and described.

5. A car truck, provided with a brass engaging the axle from above, and slidable longitudinally thereof an oil casing supported on the said brass, and an axle box likewise supported on the brass and recessed to receive the same and the oil casing, substantially as described.

6. A car truck, provided with an axle brass formed on its top with a shoulder, and an oil casing formed in its top with an opening for the passage of the top of the said axle brass, the said casing resting on the said shoulder, to be supported from the axle brass, substantially as shown and described.

7. A car truck, provided with a brass, an axle box in which the brass is capable of longitudinal sliding movement and interlocking parts on the brass and axle box to normally hold the former stationary in relation to the latter, the axle box being open at the bottom to permit of raising it relatively to the brass and disengaging the interlocking parts of the brass and axle box, substantially as described.

8. A car truck, provided with a frame, an axle box fitted to slide in the side of the frame, thrust plates held on the said axle box and having sliding engagement with the said side of the frame, and a yoke held in one of the said plates and adapted to abut against the hub of the car wheel, substantially as shown and described.

GEORGE B. ESTERLEY.

Witnesses:
GEORGE E. BAMFORD,
HENRY H. EARL.